United States Patent
Noble et al.

(10) Patent No.: US 6,754,668 B2
(45) Date of Patent: Jun. 22, 2004

(54) MULTILINGUAL SYSTEM HAVING DYNAMIC LANGUAGE SELECTION

(75) Inventors: William B. Noble, Santa Monica, CA (US); Faisal Turki Al-Bakr, Riyadh (SA); Sheri L. Moore, Yorba Linda, CA (US)

(73) Assignee: Raytheon Company, Waltham, MA (US)

( * ) Notice: Subject to any disclaimer, the term of this patent is extended or adjusted under 35 U.S.C. 154(b) by 291 days.

(21) Appl. No.: 09/981,113

(22) Filed: Oct. 17, 2001

(65) Prior Publication Data

US 2002/0111933 A1 Aug. 15, 2002

Related U.S. Application Data (60) Provisional application No. 60/242,856, filed on Oct. 24, 2000.

(51) Int. Cl.$^7$ .............................................. G06F 17/30
(52) U.S. Cl. ............................ 707/102; 707/3; 707/10; 707/100; 707/104.1
(58) Field of Search ................................ 707/2, 3, 4, 5, 707/10, 100, 104.1, 102

(56) References Cited

U.S. PATENT DOCUMENTS

| | | | | |
|---|---|---|---|---|
| 5,191,534 A | * | 3/1993 | Orr et al. ..................... | 700/105 |
| 5,206,949 A | * | 4/1993 | Cochran et al. ............... | 707/4 |
| 5,210,868 A | * | 5/1993 | Shimada et al. ............... | 707/5 |
| 5,257,365 A | * | 10/1993 | Powers et al. ............... | 707/100 |
| 5,260,866 A | * | 11/1993 | Lisinski et al. ............... | 705/29 |
| 5,283,865 A | * | 2/1994 | Johnson ....................... | 345/854 |
| 5,440,482 A | * | 8/1995 | Davis ............................ | 707/6 |
| 5,497,319 A | * | 3/1996 | Chong et al. .................. | 704/2 |
| 5,535,120 A | * | 7/1996 | Chong et al. .................. | 704/3 |
| 5,625,773 A | * | 4/1997 | Bespalko et al. ........... | 345/467 |
| 5,652,884 A | * | 7/1997 | Palevich ....................... | 713/1 |
| 5,664,189 A | * | 9/1997 | Wilcox et al. .............. | 707/205 |
| 5,778,356 A | * | 7/1998 | Heiny .......................... | 707/2 |

\* cited by examiner

Primary Examiner—Frantz Coby
(74) Attorney, Agent, or Firm—Daly, Crowley & Mofford, LLP (57) ABSTRACT

A multilingual system provides dynamic flipping of a displayed form from one language to another. The forms include a plurality of fields each of which includes properties that allow the form to be displayed in accordance with the conventions of the selected language. When switching from one language to another, the form field properties are modified to properly display the form in the new language.

21 Claims, 11 Drawing Sheets

| Specialty | Authorized | Assigned | Unavailable | Available |
|---|---|---|---|---|
| Staff Officer-Communications | 3 | 3 | 0 | 3 |
| Staff Officer-Logistics | 1 | 1 | 0 | 1 |
| Staff Officer-Intelligence | 2 | 2 | 0 | 2 |
| Staff Officer-Operations and Plans | 5 | 5 | 0 | 5 |
| Warrant Officer-Supply and Maint | 7 | 4 | 0 | 4 |

MULTILINGUAL SYSTEM HAVING DYNAMIC LANGUAGE SELECTION

CROSS REFERENCE TO RELATED APPLICATIONS

This application claims the benefit of U.S. Provisional Patent Application No. 60/242,856, filed on Oct. 24, 2000.

STATEMENT REGARDING FEDERALLY SPONSORED RESEARCH

Not Applicable.

FIELD OF THE INVENTION

The present invention relates generally to computer systems, and more particularly, to computer systems having multilingual displays.

BACKGROUND OF THE INVENTION

There are a variety of systems that can handle data in more than one language. Such systems generally require a user to select an initial language for operation when the system is started. Some systems can support data entry in multiple languages simultaneously but have menus and help text in only one language. In general, these systems do not allow dynamic switching between languages. For example, some systems require a reboot of the system to allow a user to select a language for operation. Other systems require that the particular application program be restarted to select a language for operation. It will be appreciated that requiring a restart of a multilingual system is cumbersome and inefficient particularly when the language change should happen quickly.

It would, therefore, be desirable to provide a system that allows dynamic switching between different languages. It would further be desirable to provide a multilingual system that can automatically display information in accordance with the conventions of the selected language.

SUMMARY OF THE INVENTION

The present invention provides a multilingual system that allows an operator to dynamically switch between languages. In general, one display supports multiple languages by automatically positioning and configuring corresponding display fields in accordance with the conventions of the selected language conventions. This arrangement eliminates the need for designing multiple forms and manual positioning of fields in each form to account for different language formats. While the invention is primarily shown and described in conjunction with displaying available resources in a military environment, it is understood that the invention is applicable to other systems having a display in which it is desirable to switch between two or more languages.

In one aspect of the invention, a system includes a workstation and a display that can dynamically flip between languages. A database is coupled to the workstation from which data for display can be retrieved. The workstation can be connected to a network in a conventional manner. The system displays forms and other information including maps that provide information to the user with one form generally corresponding to one display screen. Each form includes a plurality of fields, such as text boxes, command buttons and the like. The properties for each field in each supported language are encapsulated within the field as display objects.

With this arrangement, the field properties can be modified upon receiving a change language command from the user. This eliminates the need for a form for each supported language and fields for each language as in known systems. In addition to improvements in form development and display efficiency, altering the field properties in accordance with the present invention reduces the likelihood of errors since fewer fields need to be managed.

In a further aspect of the invention, a method of flipping languages on a display screen includes receiving a language swap request from a user and changing a display language of a form having a plurality of fields from a first language to a second language. The method further includes selecting field properties to display the form in accordance with the conventions of the selected language. The display properties for each field for each supported language are encapsulated. Thus, each field supports multilingual display of the form for efficient swapping from one language to another.

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
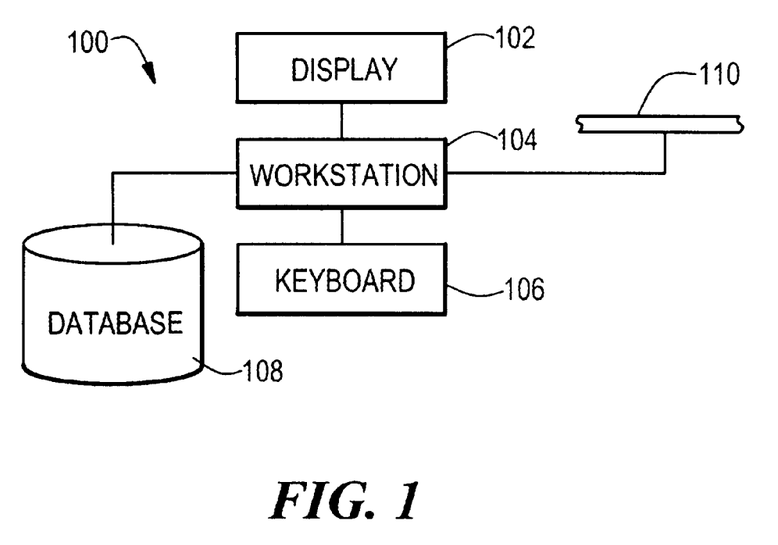
FIG. 1 is a block diagram of a multilingual system having dynamic display language flipping in accordance with the present invention.

FIG. 1 shows an exemplary multilingual system 100 having dynamic language swapping or "flipping" in accordance with the present invention. In general, the system allows a user to quickly and efficiently switch the language of a displayed form from a first language, e.g., English, to a second language, e.g., Arabic. The displayed information can include textual data and graphics. The system 100 automatically switches the text language and graphics position to generate a display format in accordance with the conventions of the newly selected language. For example, the system can automatically move display objects and change text justification when the display is switched between English and Arabic, which read in different directions.

The system 100 includes a display 102 coupled to a workstation 104. A keyboard 106 supporting multiple languages is coupled to the workstation for inputting data. The workstation can include a database 108 from which data to be displayed can be stored and retrieved. The workstation 104 can be connected to network 110 in a conventional manner.

In one particular embodiment, the multilingual system 100 provides military resource management functionality that can be displayed in a plurality of languages. Exemplary data stored by the database includes base information, unit status, infrastructure data, equipment information, personnel, and munitions data. It is understood that the multilingual system of the present invention is well-suited for a wide range of applications in which dynamic multilanguage display flipping is desirable. It is further understood that many languages including symbolic languages, instead of or in addition to English and Arabic, can be supported by a dynamic language flipping system in accordance with the present invention.

Figure 2A:
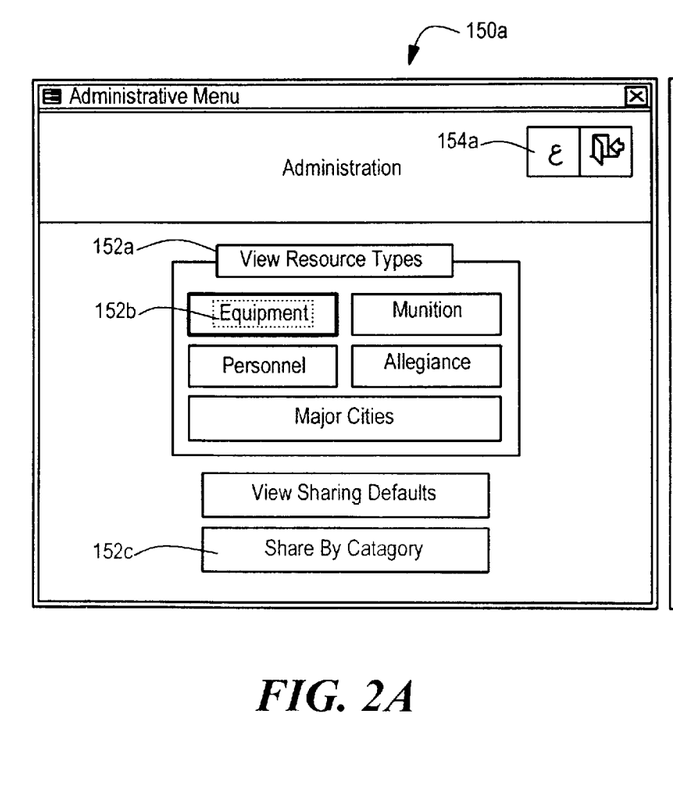
FIG. 2A is a display screen of an exemplary form in English that can be displayed by the system of FIG. 1.
Figure 2B:
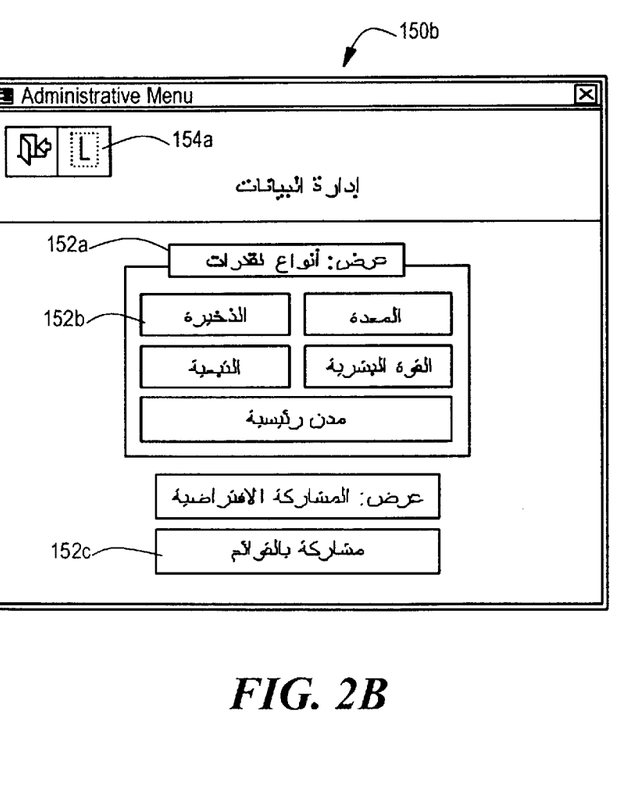
FIG. 2B is a display screen of the form of FIG. 2A in Arabic.

FIGS. 2A–B show respective top level display screens 150a,b for a multilingual system having dynamic language flipping in accordance with the present invention, such as the system 100 of FIG. 1. The information displayed by the system relates to a military environment. FIG. 2A shows a display screen 150a in English, which reads left-to-right, and FIG. 2B shows a corresponding display screen 150b in Arabic, which reads right-to-left.

The display screens 150 are generated from a form having a plurality of fields that are displayed on the screen. As shown, exemplary fields include view resource type 152a, equipment 152b, and share by category 152c. The field information is provided by corresponding display objects that define the content and position of the fields. The display object data is retrieved from a table generated from the database 108. As described more fully below, in an exemplary embodiment the field data is retrieved from tables and the field properties are defined by tags.

The display screens 150a,b include a "flipper" button 154a,b that changes the display from one language to the other. More particularly, clicking on the flipper button 154a on the English display screen 150a changes the display to the Arabic screen display 150b. The flipper button 154 is displayed differently on the two screen displays 150a,b and is based upon the selected display language. More particularly, in English the Arabic A in symbol is displayed and in Arabic the letter "L" is displayed.

Figure 3A:
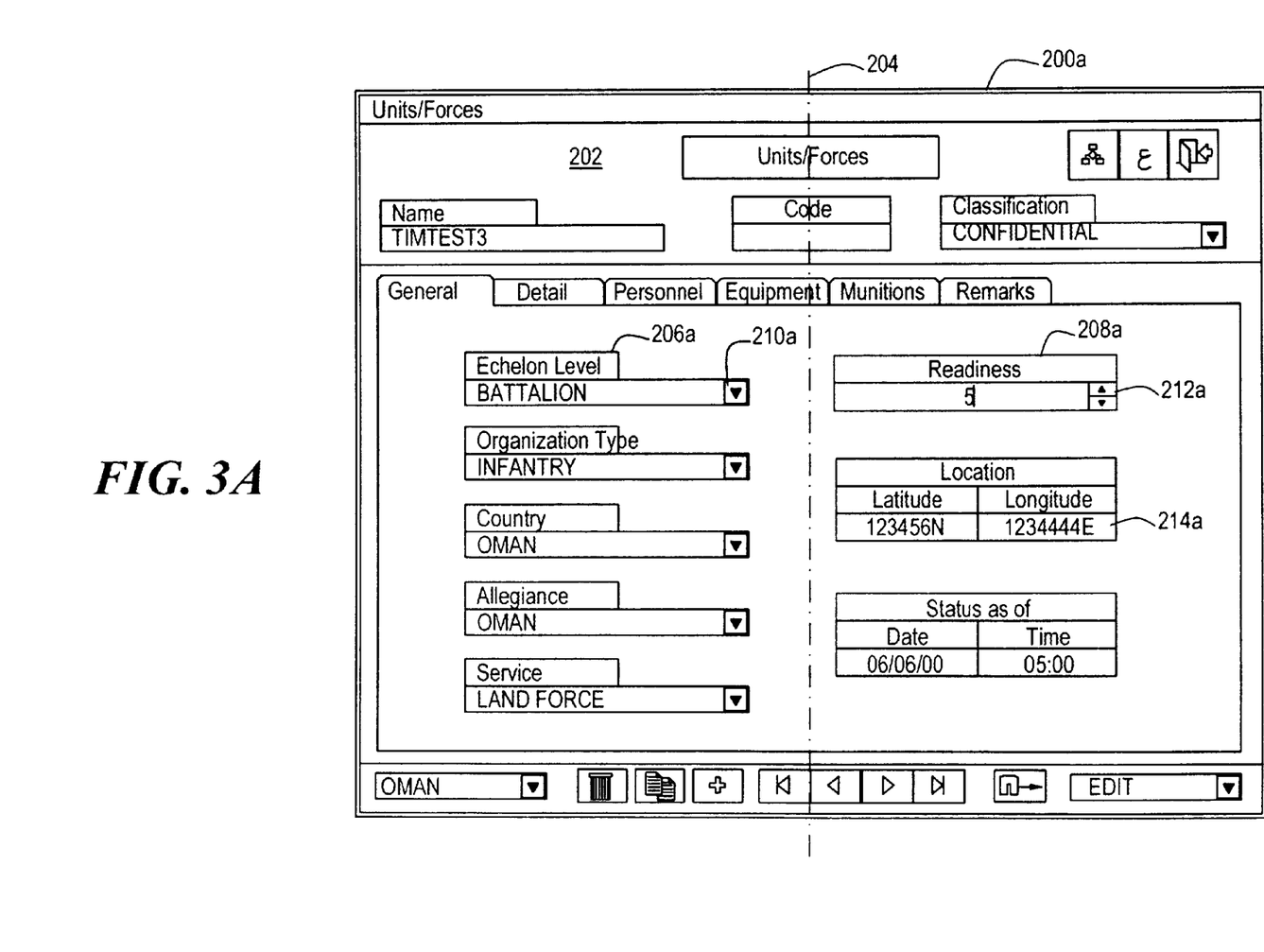
FIG. 3A is a display screen of a further exemplary form in English that can be displayed by the system of FIG. 1.
Figure 3B:
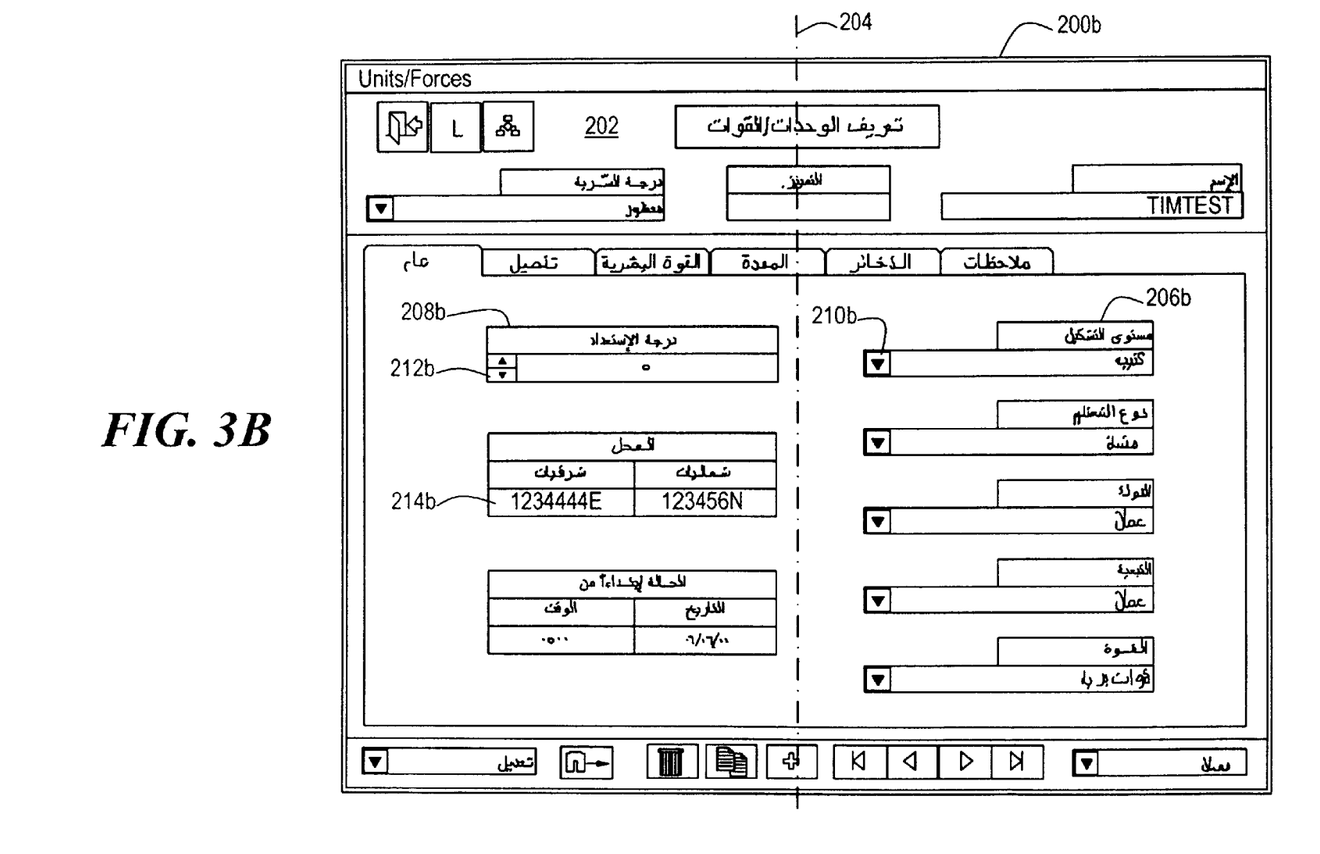
FIG. 3B is a display screen of the form of FIG. 3A in Arabic.

FIGS. 3A–B show respective display screens 200a,b in English and Arabic for a units/forces form 202 having more detail than the displays 150 of FIGS. 2A–B. As can be seen, there are numerous differences between the display screens 200a,b due to differences between English and Arabic languages. Differences include the direction in which the language (text and numbers) is read, the location of the individual fields on the form, the justification (left or right), the number styles, and the digital character representations.

In an exemplary embodiment, the English and Arabic display screens 200a,b are mirrored about a vertical axis 204. For example, the "Echelon Level" field 206a,b is located on the left side of the English screen 200a and is located on the right side of the Arabic screen 200b. The "Readiness" field 208a is located on the right side of the English screen and the corresponding field 208b is located on the left side of the Arabic screen. In addition, the text in the "Echelon" level field 206a is left justified in the English screen 200a and right justified in the Arabic screen 200b. Further differences between the English and Arabic screens include the location of pull down arrows 210a,b and adjustment arrows 212a,b. It should be noted that certain fields, such as the latitude/longitude coordinates 214, can remain the same for the two screens.

Figure 4A:
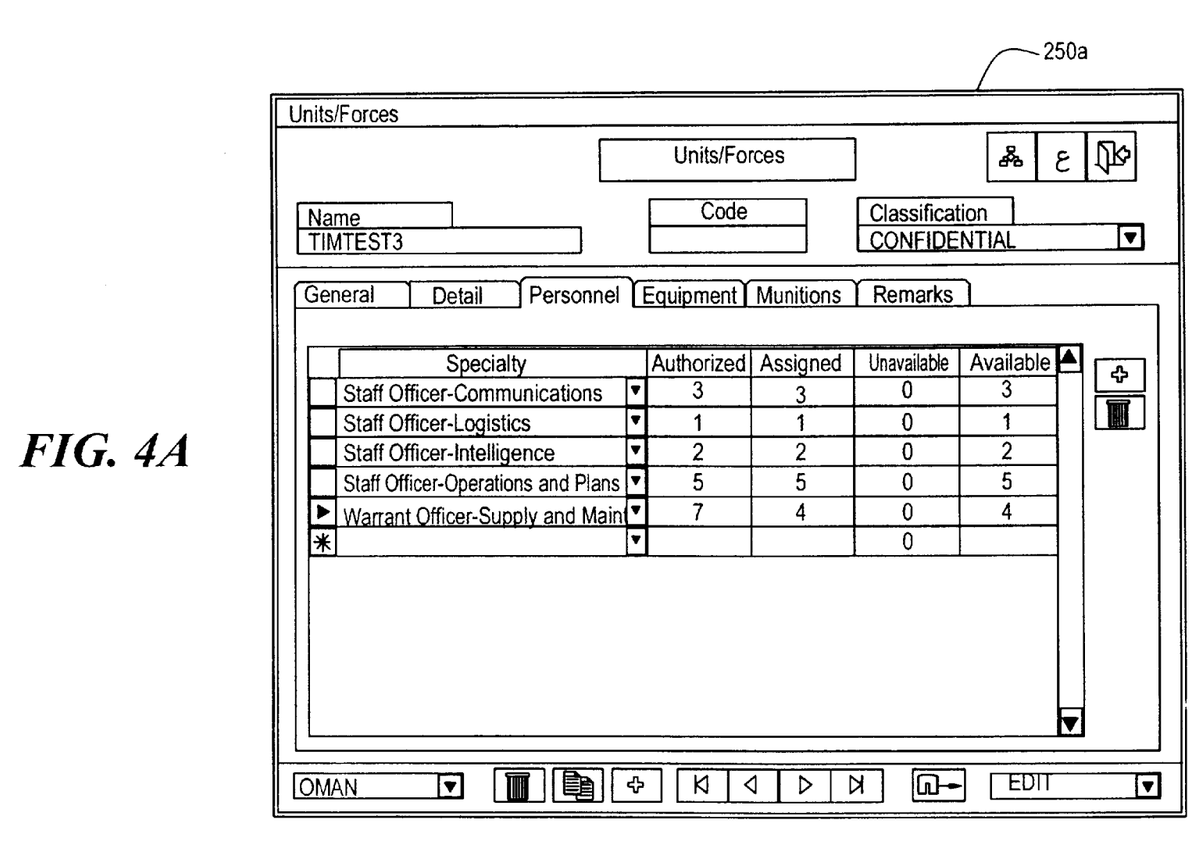
FIG. 4A is a display screen of another exemplary form in English that can be displayed by the system of FIG. 1.
Figure 4B:
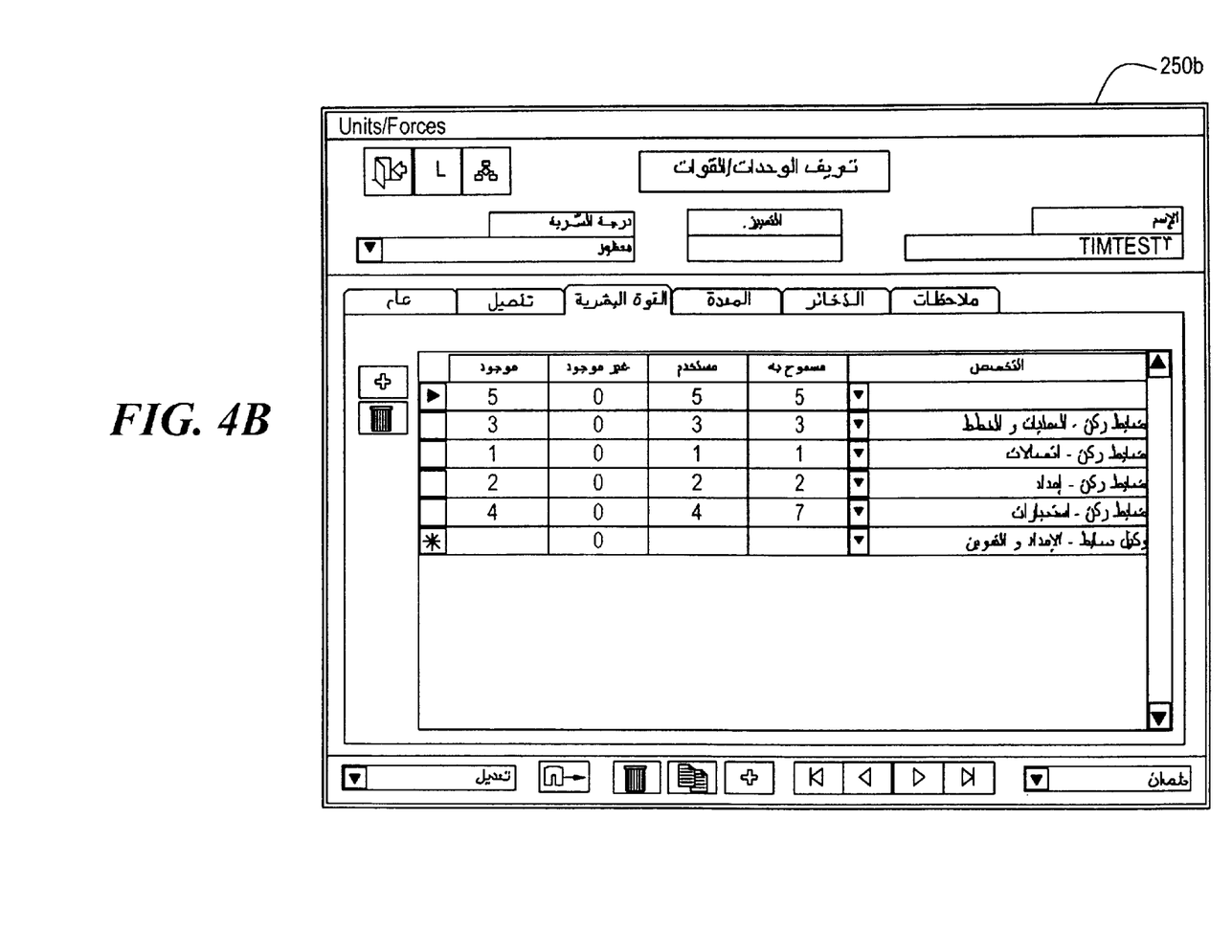
FIG. 4B is a display screen of the form of FIG. 4A in Arabic.

FIGS. 4A–B show further English and Arabic display screens 250a,b for a Units/Forces form showing the same information in accordance with the conventions of the language in which they are displayed. In this particular embodiment, Arabic numbers are used in both display screens.

In general, the information displayed by the forms is retrieved from a database, such as the database 108 of FIG. 1. The operating system, such as Windows, running on the workstation 104 should support multiple languages. The database should also support the required display languages. In one particular embodiment, a relational database, e.g., Oracle, is used. It is understood, however, that other relational databases, and object oriented databases can be readily used.

The database should support a variety of information types that will be displayed on the various screens. Since the automatic translation of free text is currently impractical, the database provides separate storage locations for the free text portions in each supported language. Numbers, such as quantities and coordinates, and dates are also stored in the database. Typically, numeric information can be stored in one location and readily converted for display in the selected language. Objects, such as programs, images and sounds, are stored in the database in one location unless there are language dependencies. For example, an image is language invariant.

The database should also support enumerated values, which can be used in association with a variety of items. For example, a security classification can be contained in many records (objects) within the database. The names used for the different levels of security classification should be consistent in the supported languages each time it is displayed.

In the present invention, enumerated values are stored in tables generated from the database as described below. The table includes a column for a code (also called a primary key), a column for the first language (English) and a column for the second or alternate language (Arabic). Table 1 below shows an exemplary Table for yes/no.

TABLE 1

| Y_N_CODE | YES_NO | YES_NO_A |
|---|---|---|
| 1 | YES | نعم |
| 2 | NO | Y |

Further tables are created for enumerated values including security classification, service, echelon, operational status, unit type, e.g., armor, country, runway surface, etc. In this arrangement, the value of the code determines what is displayed such that yes and no and the Arabic equivalent are consistent in each form.

Figure 5:
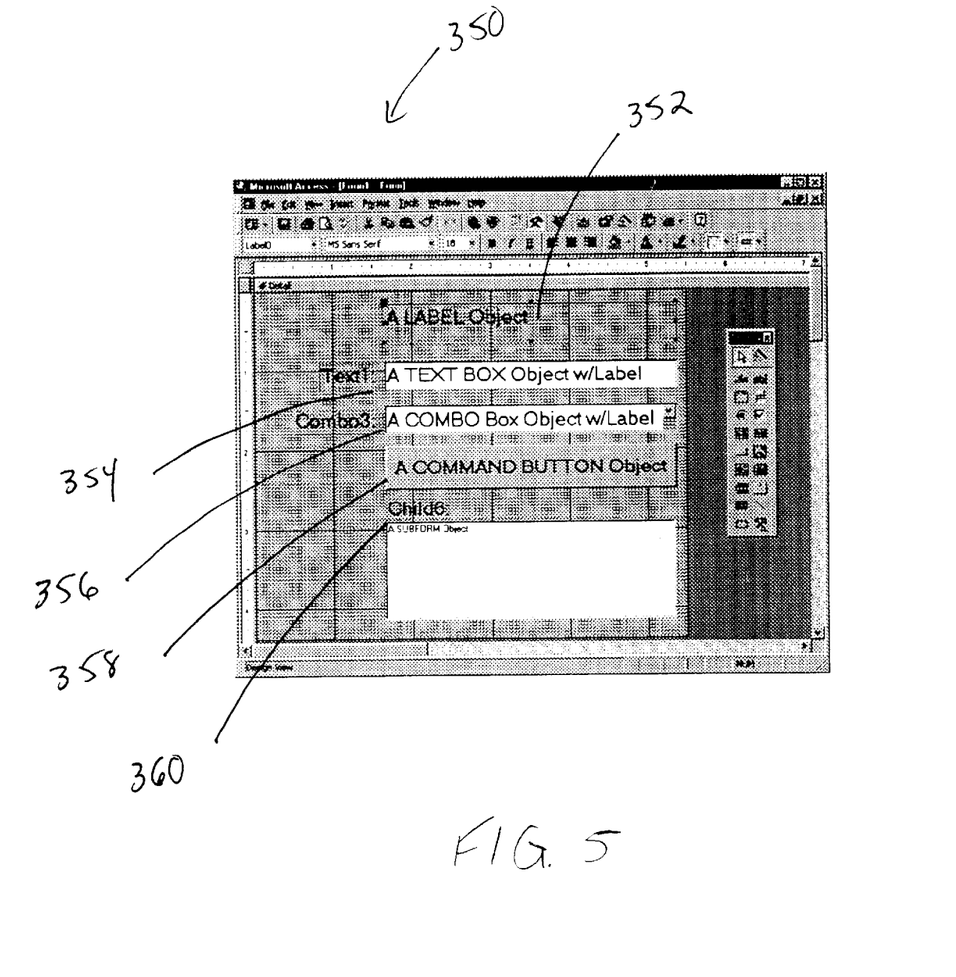
FIG. 5 is a graphical depiction showing various display objects corresponding to form fields in accordance with the present invention.

As shown in FIG. 5, each form 350 can include various types of objects each of which has specified data and display properties as described in more detail below. The form 350 can include one or more label objects 352, text objects 354, combination objects 356, command button objects 358, and subform objects 360. It is understood that these object types are illustrative and that further types of objects can be readily created.

As understood by one of ordinary skill in the art, command buttons 358 enable a user to direct the system to perform an action, such as change language or go to a different form. A command button includes a symbol, icon, or text display that is changed as a function of the currently selected display language. Command buttons can initiate many different types of action. For example, the change language command button itself takes a different action depending on the current and target languages.

Combination objects 356 refer to a form having a drop down list that when selected displays a list of choices in the currently selected display language, and when not selected displays the current choice in the currently selected display language. Combination objects should change their list content as a function of the display language, as well as adjust the orientation and location of the object itself. Text objects 354 are fields that display and/or accept text entry in the currently selected display language. Text objects adjust their display properties, the column from the database or other data source that they display, and their location based on the currently selected display language. Label objects 352 are associated with any of the above objects and provide identifying text indicating the nature and purpose of the associated object. Label objects change their contents (e.g. the label), as well as their position relative to their associated object, based on the currently selected display language. Subforms 360 refer to forms, such as those described above, that are included within a form. Subforms can include any or all of the above objects in various combinations and permutations. In addition, the subform itself can be required to move within a form based on the currently selected display language.

Figure 6A:
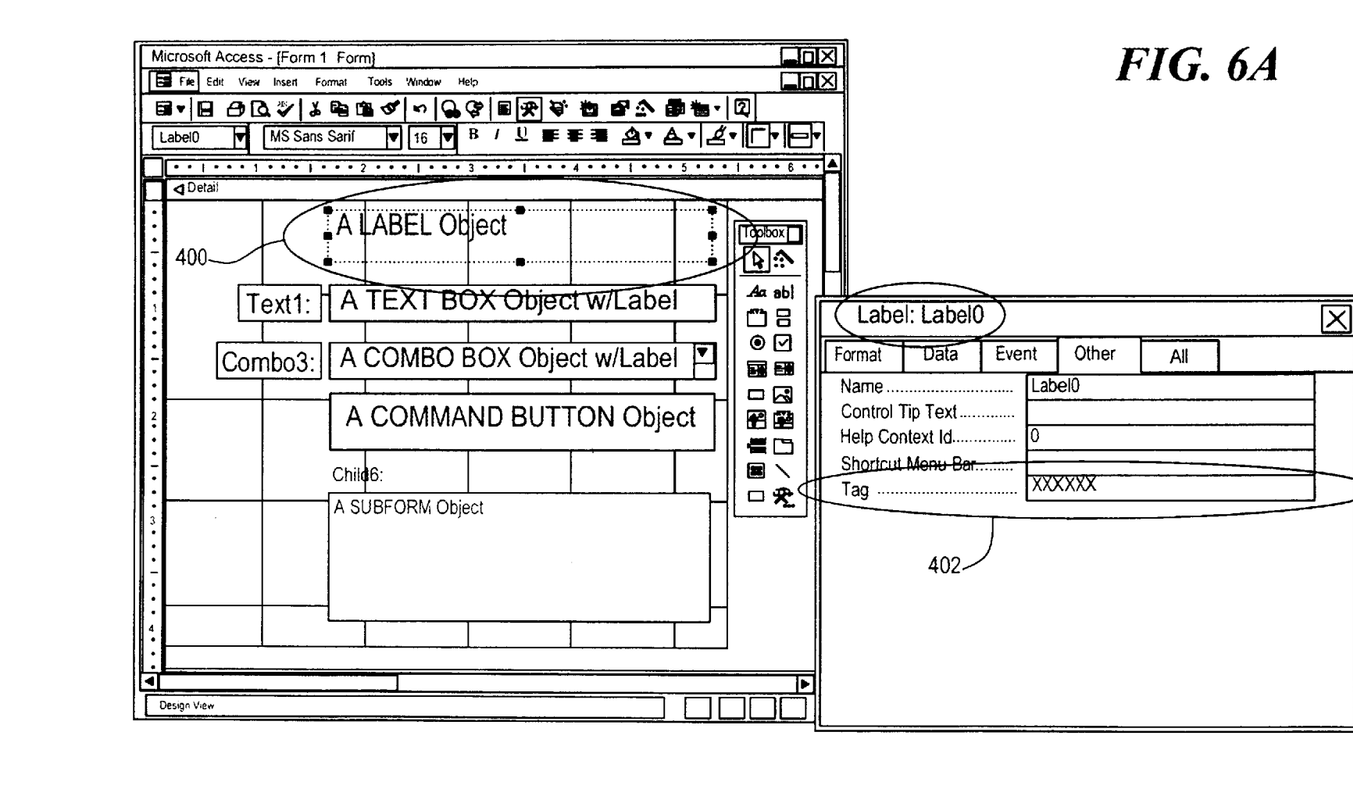
FIG. 6A is a graphical depiction of certain properties associated with a text display object that can be part of a form in accordance with the present invention.
Figure 6B:
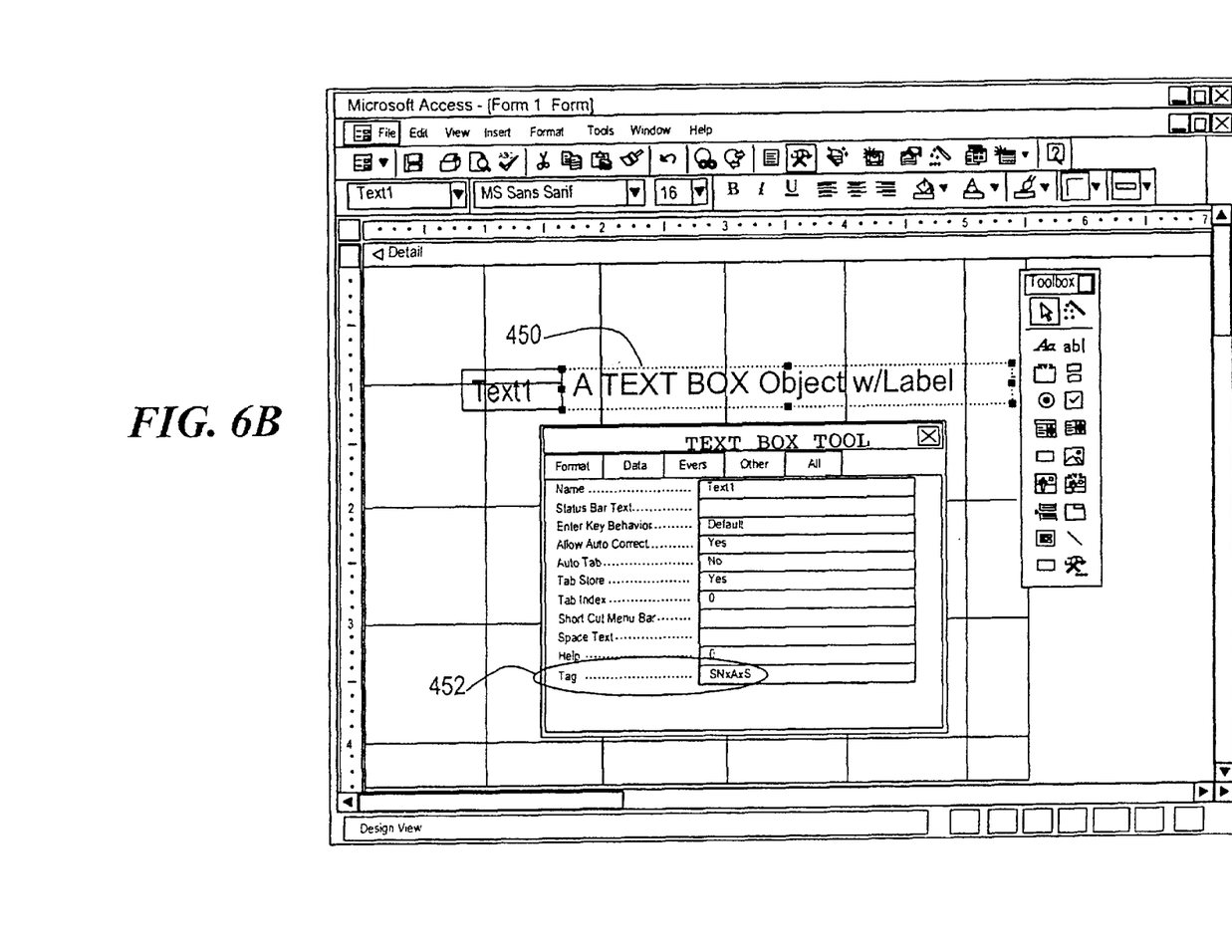
FIG. 6B is a graphical depiction of certain properties associated with a label object that can be part of a form in accordance with the present invention.
Figure 7:
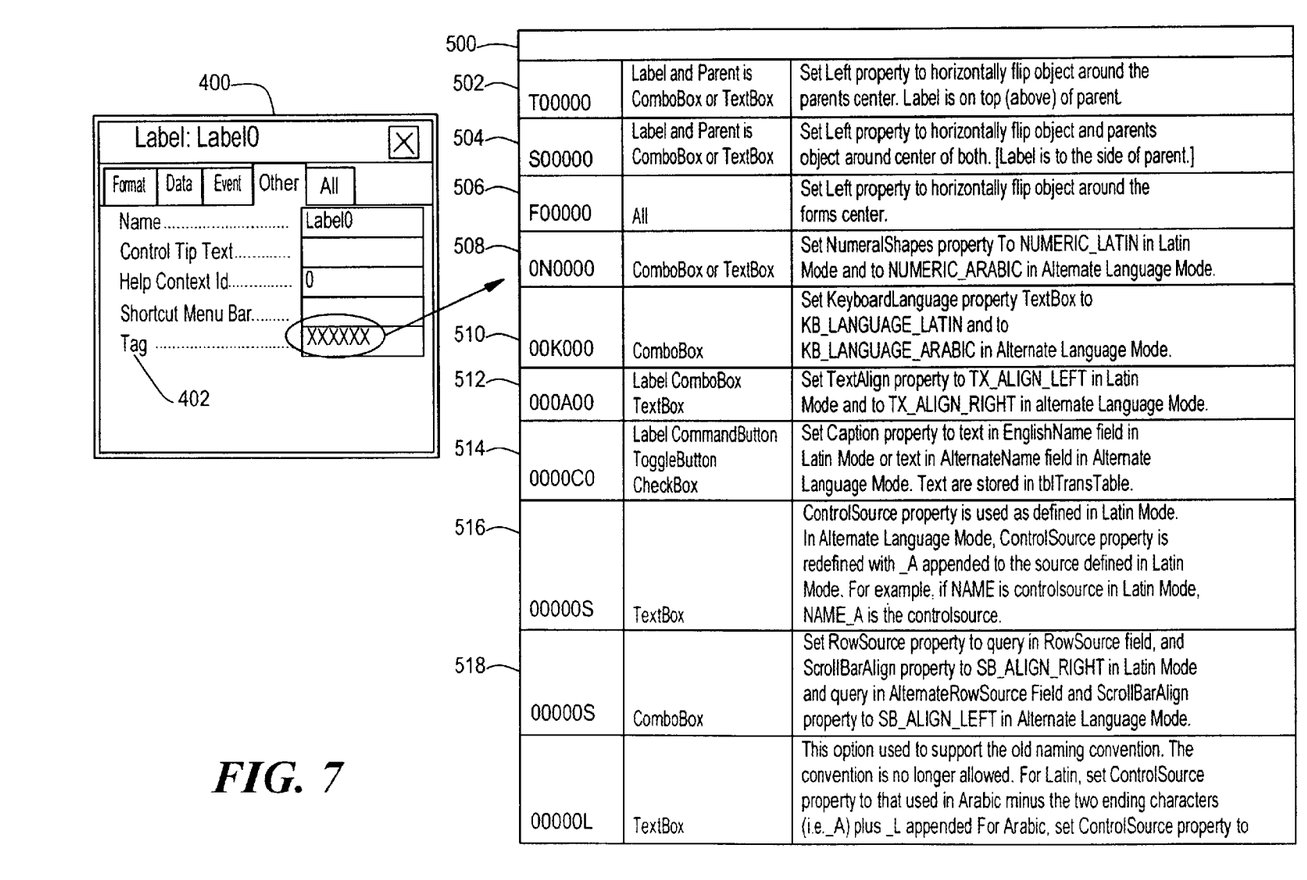
FIG. 7 is a graphical depiction of tags that define the behavior of display objects with in a form when flipping from one language to another language in accordance with the present invention.

FIGS. 6A, 6B show exemplary properties associated with a label object 400 and a text box object 450 respectively. The properties includes a tag field 402,452 that specify the behavior of the object in response to a change in language. FIG. 7 shows an exemplary tag table 500 with the tags 502–518 each including commands to set the desired display properties and data location for the associated object. For example, as shown in FIG. 6B, a tag 452 of SNxAxS, where "x" signifies don't care, specifies that tags SOOOOO 504, ONOOOO 508, OOOAOO 512, and OOOOOS 516,518 are applicable to this example object.

The ONOOOO tag 508 sets the numeral shapes property of the object to Arabic characters (1234456) in English mode and Hindi in Arabic mode (.١٢٣٤٥٦٧٨٩). The OOOAOO tag 512 right justifies the text for Arabic and left justifies text for English. The OOOOOS tag 516,518 specifies the location in the associated table to find the associated field content information depending upon the selected language. More particularly, for English the table location is rowsource and for Arabic the table location is Alternate row source (typically rowsource_A). This tag also places the scroll bar to the left or right of the object based upon the selected language.

In one particular embodiment, the OOOOOS tag appends an "_A" to the end of the control source property for text boxes (see Table 1) in the case where the alternate language, e.g., Arabic, is selected. For example, if NAME is the control source in English then NAME_A is the control source in Arabic. For combination boxes, this property specifies that a different query associated with the alternate language should be used to populate the list displayed by the box.

Figure 8:
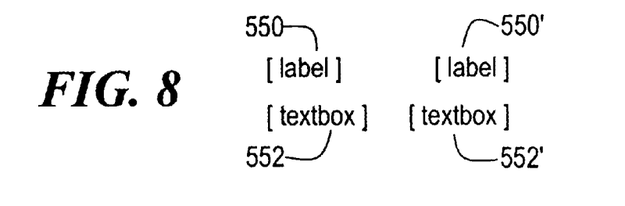
FIG. 8 is a pictorial representation showing a modification of display properties in accordance with the present invention.

Further tags include a TOOOOO tag 502 that switches the locations of a label 550 and associated text box 552 as shown in FIG. 8. The label 550, which is located over the text box 552, become right justified. The FOOOOO tag 506 moves display objects to the opposite side of the form, i.e., from the left side to the right side or from the right side to the left side. The OOKOOO tag 510 switches the language of the keyboard. And the OOOOCO tag 514 sets the caption property to display the object caption, which can be for a label, command button, toggle button, or checkbox, in the selected language. For other languages, different kinds of movements can be required to accommodate normal reading order preferences.

It is understood that the above-described tags provide one particular embodiment of the invention. It will be readily apparent to one of ordinary skill in the art that a wide variety of tag types and schemes can be used without departing from the present invention. In addition, the term tags should be construed broadly to include devices in general that modify display properties and the like.

In operation, a user selects a form for display, such as that shown in FIGS. 3A–B, that the workstation displays in the currently selected language. Each field in the form corresponds to a display object that specifies the data location and display properties for the field. As described above, the associated tables for enumerated value fields contain entries for equivalent expressions in each supported language where applicable. The system displays the form fields that contain the associated data.

When the operator activates a change language command, i.e., clicks on the flipper button 154 (FIGS. 2A–B), the field data and display properties are modified, such as by the tags described above, in accordance with the information in the display object. More particularly, the language is swapped and the graphics are changed by the tags to conform to the selected language.

This arrangement enables a user to readily change the display from one language to another supported language. Dynamic language flipping in accordance with the present invention provides several advantages over known techniques. Some known systems (for example certain multiple language web pages) include two forms each having fields that access data and display the data in predetermined ways. When switching from one language to the other, the system hides one form and displays the other form. However, the time required to switch forms can be significant and can require a relatively high level of maintenance. In addition, the forms may not be entirely consistent since each form is manually created. Other known systems utilize one form containing English and Arabic fields. To switch the display from English to Arabic, for example, the English fields are hidden and the Arabic fields are made visible. While this approach may work, it may be less than optimal.

More particularly, each field (one for each language) should be created, configured, and positioned. Each field should be consistent in position and meaning to the corresponding field in the other language(s). And each field should be managed in code. For example, English fields should be tuned on or off and and Arabic fields should also be turned on and off. The process to make changes is also burdensome. For example, to add a new field to a form requires the following:

1) add English version of field to form and associated label 2) add Arabic version of field to form and associated label 3) change code to reveal/hide new English field when flipping 4) change code to reveal/hide new Arabic field when flipping Thus, to create and modify forms requires significant duplication of effort that is obviated by the present invention.

Dynamic language flipping in accordance with the present invention encapsulates the behavior of each field. Field properties include displaying the selected language, text justification, number style, visibility, location of the field itself and its associated label, and the location of associated controls.

Figure 9:
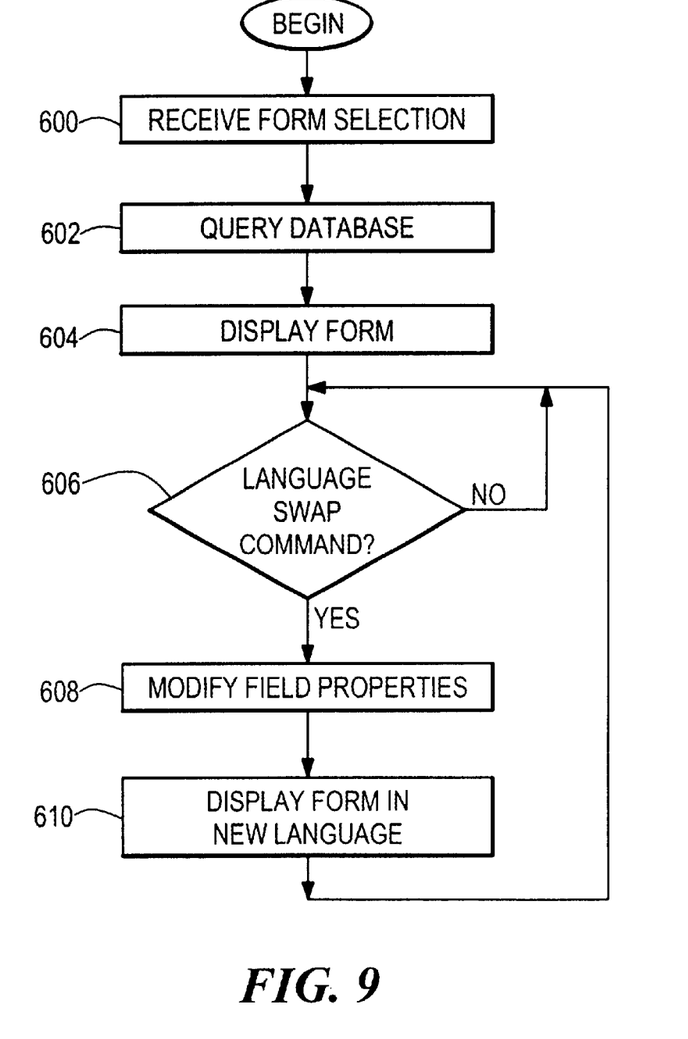
FIG. 9 is a flow diagram showing an exemplary sequence of steps for dynamically flipping a display from one language to another language in accordance with the invention.

FIG. 9 shows an exemplary sequence of steps for providing dynamic language flipping on a display screen in accordance with the present invention. In step 600, the operator selects a form to be displayed by the system as well as a default language if one has not been previously selected. Based upon the fields contained in the selected form, the system queries the database in step 602. It is understood that one or more databases can be queried as well as other types of data sources. The associated tables contain language-equivalent expressions for each supported language. In step 604, the system displays the form in the currently selected language.

In step 606, the system waits for a language swap command from the user, such as a click on the flipper 154 button (FIGS. 2A–B). Upon receiving a language flip command, in step 608 the system applies the display object properties associated with the newly selected language. Properties include data location, text justification and object position, as described in detail above. In step 610, the system displays the form in the selected language and awaits further commands from the user.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method of providing dynamic multilingual display swapping, comprising:

receiving a selected form selection for display, the selected form including a plurality of selected form fields;

retrieving from a database field data and display properties corresponding to the plurality of form fields, wherein the retrieved field data includes information corresponding to a plurality of languages;

populating the plurality of form fields with the retrieved field data and the retrieved display properties;

displaying a portion of the plurality of form fields with first field data from the retrieved field data corresponding to a first one of the plurality of languages and having a first display format in accordance with first display properties from the retrieved display properties; and switching the displayed form fields from the portion of form fields with first field data corresponding to the first one of the plurality of languages to a second different portion of the form fields with second field data from the retrieved field data corresponding to a second one of the plurality of languages upon receiving a change language command, the second one of the plurality of languages having a second display format in accordance with second display properties from the retrieved display properties, wherein the second display format is different from the first display format.

2. The method according to claim 1 further including placing the field data from the database into a table.

3. The method according to claim 2, further including forming respective table entries for the field data in two or more of the plurality of languages.

4. The method according to claim 3, further including generating a table from the field data having a column for a code and associated columns for the plurality of languages containing equivalent expressions for the code.

5. The method according to claim 1, further including providing a flipper mechanism for enabling a user to change the displayed field data from the first one of the plurality of languages to the second one of the plurality of languages.

6. The method according to claim 1, further including providing a flipper icon for enabling a user to change the displayed field data from the first one of the plurality of languages to the second one of the plurality of languages.

7. The method according to claim 1, wherein the display properties include one or more of a display of one of the plurality of languages, and a text justification, a field location, a number style, a visibility, a label location, and a control location associated with the one of the plurality of languages.

8. The method according to claim 1, further including using tags to modify the display properties in response to the switching the displayed data.

9. The method according to claim 1, further including encapsulating the display properties for the form fields.

10. The method according to claim 1, further including storing free text for the plurality of languages in the database.

11. The method according to claim 1, further including storing enumerated values for the plurality of languages in the database.

12. The method according to claim 1, wherein the form includes one or more of label objects, text objects, combination objects, command button objects, and sub form objects.

13. The method according to claim 1, wherein the form provides information for a military environment.

14. The method of claim 1, wherein the first display format corresponds to left justification and the second display format corresponds to right justification.

15. The method of claim 1, wherein the switching includes mirroring the displayed form fields about a central display axis.

16. The method of claim 1, wherein the switching includes mirroring the displayed form fields about a central display axis, and wherein the first display format corresponds to left justification and the second display format corresponds to right justification.

17. The method of claim 1, wherein the display properties include at least one display format tag and the first display format and the second display format are selected in accordance with the at least one display format tag.

18. A system having dynamic language display swapping, comprising:

a processor;

a database coupled to the processor; and a screen to display a form having a plurality of form fields and to display field data associated with data from the database as a plurality of displayed form fields, wherein data from the database for the plurality of displayed form fields includes display properties defining display characteristics of the displayed field data to enable dynamic swapping between a plurality of languages and to enable dynamic re-formatting of the displayed field data in response to a change display language command.

19. The method of claim 1, wherein the dynamic re-formatting of the displayed form fields includes at least one of dynamic re-justification of the displayed field data and mirroring of the displayed form fields about a central display axis.

20. A computer readable medium having computer readable code, comprising instructions for:

receiving a selected form selection for display, the selected form including a plurality of form fields;

retrieving from a database field data and display properties corresponding to the plurality of form fields, wherein the retrieved field data includes information corresponding to a plurality of languages;

populating the plurality of form fields with the retrieved field data and the retrieved display properties;

displaying a portion of the plurality of form fields with first field data from the retrieved field data corresponding to a first one of the plurality of languages and having a first display format in accordance with first display properties from the retrieved display properties; and switching the displayed form fields from the portion of form fields with first field data corresponding to the first one of the plurality of languages to a second different portion of the form fields with second field data from the retrieved field data corresponding to a second one of the plurality of languages upon receiving a change language command, the second one of the plurality of languages having a second display format in accordance with second display properties from the retrieved display properties, wherein the second display format is different from the first display format.

21. The computer readable medium of claim 20, wherein the switching includes mirroring the displayed form fields about a central display axis, and wherein the first display format corresponds to left justification and the second display format corresponds to right justification.

* * * * *

UNITED STATES PATENT AND TRADEMARK OFFICE
CERTIFICATE OF CORRECTION

PATENT NO. : 6,754,668 B2
DATED : June 22, 2004
INVENTOR(S) : Noble et al.

It is certified that error appears in the above-identified patent and that said Letters Patent is hereby corrected as shown below:

Drawings,
Replace Figure 5 with the following Figure:

FIG. 5

Column 3,
Line 54, delete "Arabic A in symbol" and replace with -- Arabic A symbol --.

Column 5,
Line 41, delete "properties includes" and replace with -- properties include --.

Signed and Sealed this

Second Day of August, 2005

JON W. DUDAS
Director of the United States Patent and Trademark Office